United States Patent
Hepner et al.

[11] Patent Number: 5,909,275
[45] Date of Patent: Jun. 1, 1999

[54] G-HARDENED OPTICAL ALIGNMENT SENSOR

[75] Inventors: David J. Hepner, Elkton; Michael S. L. Hollis, Abingdon, both of Md.

[73] Assignee: The United States of America as represented by the Secretary of the Army, Washington, D.C.

[21] Appl. No.: 08/982,468

[22] Filed: Dec. 2, 1997

[51] Int. Cl.⁶ .............................. G01B 11/26; G01C 1/00
[52] U.S. Cl. ..................... 356/141.2; 356/141.5
[58] Field of Search ................. 356/141.2, 141.5

[56] References Cited

U.S. PATENT DOCUMENTS

| | | | |
|---|---|---|---|
| 3,205,361 | 9/1965 | Albus | 356/141.2 |
| 3,951,550 | 4/1976 | Slick | 356/141.5 |
| 4,410,270 | 10/1983 | Zuckerman | 356/141.2 |
| 4,804,832 | 2/1989 | Gardner | 356/141.5 |
| 4,824,245 | 4/1989 | Gardner et al. | 356/141.5 |

*Primary Examiner*—Stephen C. Buczinski
*Attorney, Agent, or Firm*—Paul S. Clohan, Jr.

[57] ABSTRACT

An optical alignment device having a sensor housing with obstructing geometry which restricts the amount of sunlight that enters the sensor and impinges upon a photoelectric cell within the sensor body. The restriction of light properly maintains a constant area of illumination of the photoelectric cell over a wide range of incident angles about the insensitive axis. Variations in incident angle about the sensitive axis produces a significant change in illumination area for small changes in the incident angle. Thus, the device produces a significant change in output with respect to alignment with its sensitive axis and an invariant output with respect to alignment to its insensitive axis.

4 Claims, 3 Drawing Sheets

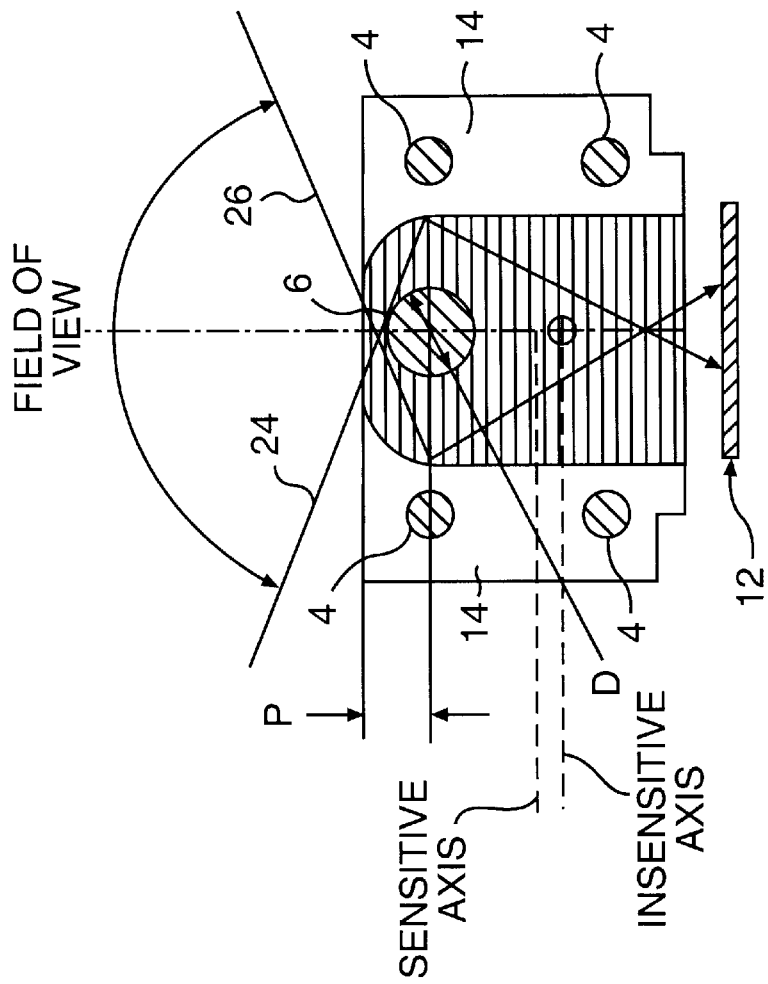
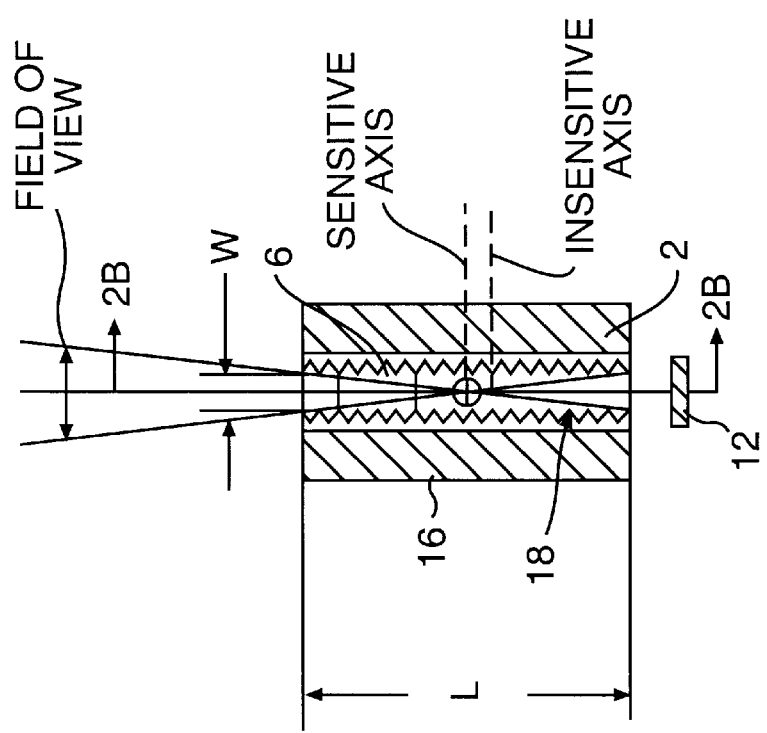
FIG. 2A
FIG. 2B

G-HARDENED OPTICAL ALIGNMENT SENSOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Restricted slit silicon solar cells have been steadily used by the Army since the early 1970's to indicate the solar attitude and the roll rate of a projectile. Earlier versions of this technology may have originated in England in the early 1950's. These prior art slit restriction/cell designs have problems in both field-of-view and linear response specifications. In addition, most designs appeared prohibitively voluminous in practice. Our design provides increased sensitivity, linear response, and reduced size constraints required for advanced munitions concepts.

One prior art publication dealing with this technology is SIR No. H746 published in February 1990 entitled "Solar Reference Flight Roll Position Sensor". The device disclosed in this publication is a sensor that uses the sun as a roll position reference. The sunlight passes through an opaque screen, which has an aperture, and the sunlight illuminates a photo detector. The electric pulses that are generated are processed to form a discriminant that is a function of roll position. Roll rate of the flight vehicle is determined by measuring the rate of change of the roll position. The disclosed design, however, is complicated, large in design, not g-hardened, and designed for low roll rate applications of space vehicles.

BRIEF SUMMARY OF THE INVENTION

It is therefore an object of the present invention to disclose a state-of-the-art slitted optical alignment device utilized in determining the orientation of an object with respect to a parallel light source.

A further object of the present invention is to disclose a miniaturized electro/optical alignment device which can endure acceleration loads up to 100,000 G's.

A still further object of the present invention is to disclose a device wherein the alignment of rotating projectiles can be used to determine the attitude and roll position of the projectile through the application of multiple devices configured circumferentially around the projectile at known tilt angles with occurrences to a parallel light source on the spinning projectile can aid to in determining the flight dynamics.

Still other objects and advantages of the present invention will become readily apparent to those skilled in this art from the detailed description, wherein only the preferred embodiment of the present invention is shown and described, simply by way of illustration of the best mode contemplated of carrying out the present invention. As will be realized, the present invention is capable of other and different embodiments, and its several details are capable of modifications in various obvious respects, all without departing from the present invention. Accordingly, the drawings and descriptions are to be regarded as illustrative in nature, and not as restrictive.

These and other objects are achieved by an optical alignment device having a sensor housing with obstructing geometry which restricts the amount of sunlight that enters the sensor and impinges upon a photoelectric cell within the sensor body. The restriction of light properly maintains a constant area of illumination of the photoelectric cell over a wide range of incident angles about the insensitive axis. Variations in incident angle about the sensitive axis produces a significant change in illumination area for small changes in the incident angle. Thus, the device produces a significant change in output with respect to alignment with its sensitive axis and an invariant output with respect to alignment to its insensitive axis.

Applications of our device include alignment of objects to various light sources, related optical devices and alignment fixtures with respect to a known light source orientation. Extended analog applications include the determination of misalignment of optical fixtures and applications to ballistic and space vehicles using the sun as a parallel light source. Our sensor can be used to create an electronic pulse train that may be telemetered throughout the flight of the spinning flight vehicle. Solar attitude and roll position of flight vehicles can be obtained through the application of multiple devices configured circumferentially around a flight vehicle at known tilt angle with respect to the roll axis of the vehicle. The resulting time history of consecutive sensor occurrences to a parallel light source on a spinning vehicle can aid the determination of the flight dynamics of the flight vehicle.

BRIEF DESCRIPTION OF THE SEVERAL VIEWS OF THE DRAWING

FIG. 2A depicts the width and length and length that provide a means of adjusting the field-of-view in the sensitive axis.

FIG. 2B is a view along lines 2A—2A in FIG. 2A.

DETAILED DESCRIPTION OF THE INVENTION

Figure 1:
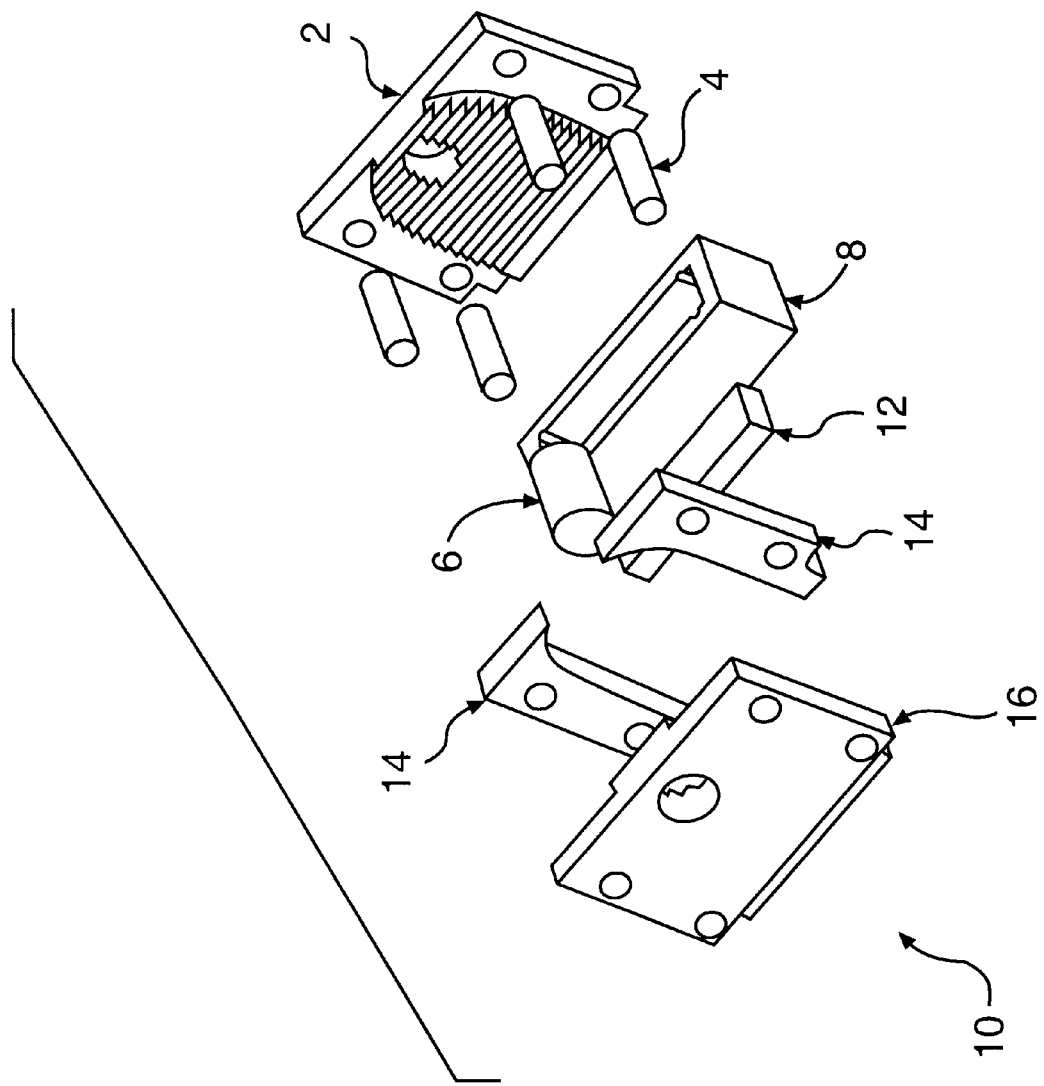
FIG. 1 depicts an exploded assembly schematic of the components of our device.

The present invention is designed to endure the extremely high acceleration environment provided by the gun launch of a ballistic flight vehicle. FIG. 1 shows our sensor 10 that is compact and very light weight. Shown in FIG. 1 are the components of our device which consists of sensor cell sides 2 and 16, base 8, an optical sensor 12, reflecting surfaces 14, an obstructing pillar 6, and four assembly pins 4.

Optical sensor 12 provides an output indicative of the physical alignment of sensor 10 with respect to a parallel light source. The field-of-view characteristics of slitted sensor 10 can be best understood by referring to FIG. 2A. The specific configuration of sensor 10 can be adjusted by varying the width W and length L forming a column which will set the field-of-view in the "sensitive axis". This column may have any geometric cross-section (i.e., round, hexagonal, ovoid). The width W is on the order of 0.010 inches. Rotation of sensor 10 about the "sensitive axis" produces extreme variation of amplitude response of the electric pulse generated by optical sensor 12. Shown also in FIG. 2A are light trap ridges 18 which are used to eliminate internal reflections in the sensitive axis.

Rotation of sensor 10 about its "sensitive axis" generates a pulse of electricity which can be processed to form a discriminate that is a function of roll orientation about the "sensitive axis". The peak of the response represents the position of sensor 10 where photoelectric cell 12 is receiving the maximum amount of direct light and is an indication of alignment of sensor 10 with the parallel light source in the "sensitive axis". Sensor 10 output can be conditioned to provide a digital "high" when 30% of the maximum output is reached. The output returns to a digital "low" when the 30% level is reached again on the downward side of the pulse. The center of the transitions is equivalent to physical alignment of the sensor 10 housing with the light source.

FIG. 2B shows the position P and diameter D of the obstructing pillar 6 which determines the amplitude response with respect to the incident angle of impinging light in the "insensitive axis". The parameters P & D are used to eliminate amplitude sensitivity in the "insensitive axis" direction. Mirrored reflectors 14 allow light to pass into the sensor 10 body when light is at extreme angles to the sensor 10 face. Thus, photoelectric cell 12 can acquire the rays of light through a wide range of incident angles. Rotation about "insensitive axis" produces little or no amplitude variation.

Once aligned, sensor 10 can indicate the obstruction of the light due to objects passing between the light and sensor 10. The digital transitions can be used to indicate the positions and/or rate of the objects within the field-of-view of sensor 10.

Figure 3:
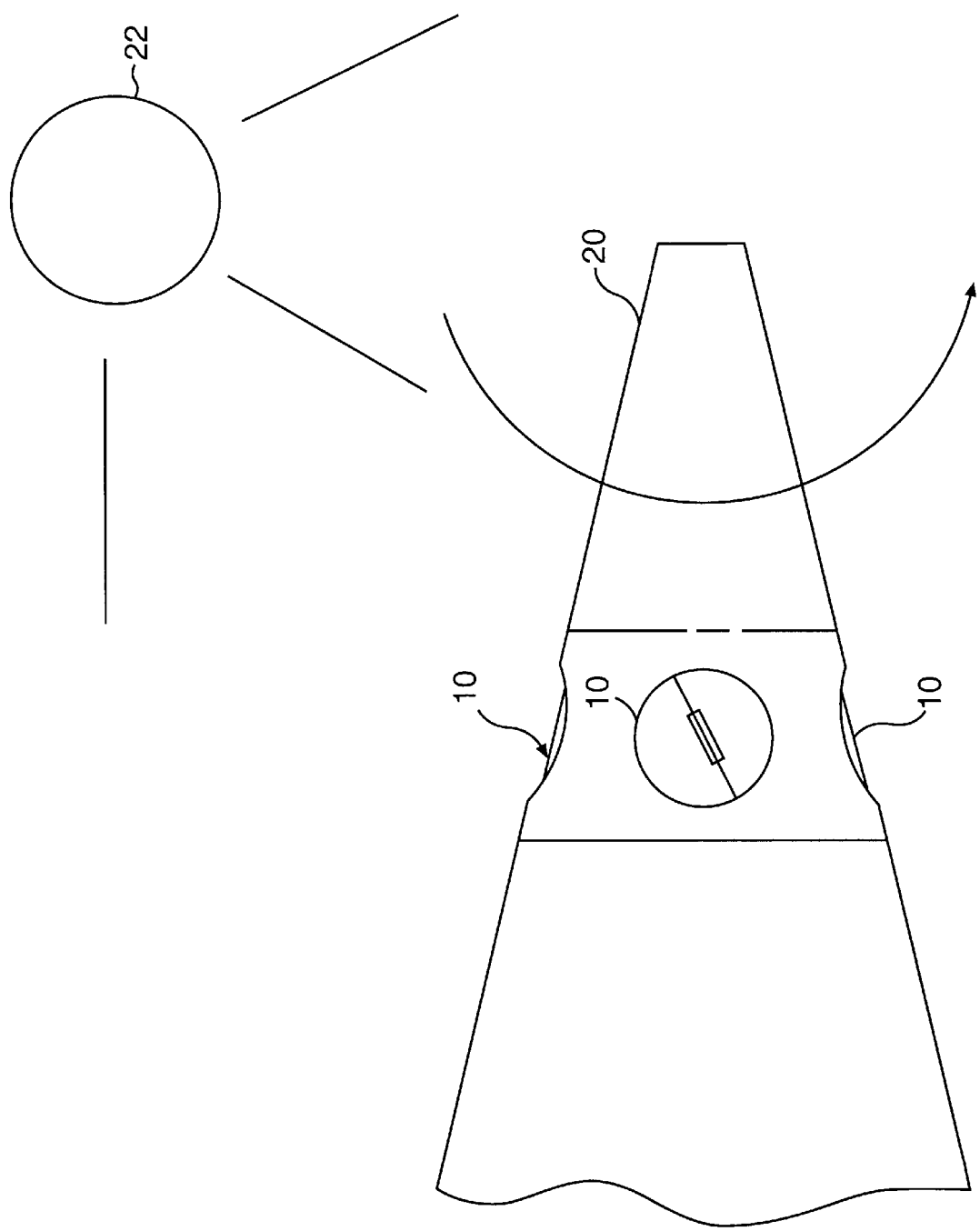
FIG. 3 depicts the orientation of our device on a projectile.

A configuration utilizing multiple sensors 10 which can aid in extracting aerodynamic properties of flight vehicles is shown in FIG. 3. This configuration can be used to determine the attitude of spinning, free-flying vehicle 20 with respect to parallel light source 22 (e.g. the sun). A configuration having multiple sensors 10 purposely misaligned with the roll axis of sensor 10 can indicate the attitude change with respect to light source 22 over a history of flight motion and roll rates. When tilted with respect to the roll axis of projectile 20, the roll position of sensor 10 alignment is indicative of the angle between the roll axis of projectile 20 and parallel light source 22. When a variety of sensor tilts are used, a unique solution to the attitude with respect to light source 22 can be determined. Normally, sensors 10 are placed at alternating tilt angles with respect to the roll axis on spinning projectile 20.

In practice, sensor-equipped spinning projectile 20 will be provided a pulse train, which when combined with calibration data, provides a measurable quantity of the attitude and roll history of projectile 20. Once sensor 10 is installed, a calibration can be completed noting sensor 10 peak responses at a wide range of roll positions and angular attitudes with respect to parallel light source 22. During flight testing, raw data are collected usually consisting of a long pulse train indicative of consecutive sensor 10 alignments with sun 22. The measurable phase relationship between pulses can be related to the calibration data to provide an experimental measurement of the attitude of the roll axis of projectile 20 with the solar vector. Once known, the attitude information also provides the roll position of each sensor 10 occurrence and the roll history and related derivatives, roll rate and roll acceleration.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

We claim:

1. A device to generate a pulse of electricity in response to rotation of said device with respect to a light source comprising:

a housing having a hollow interior of rectangular cross-section, said housing comprising a first set of opposed interior side walls, a second set of opposed interior side walls, a narrow opening at the top of said housing and a single photoelectric cell located at the bottom of said housing;

said first set of opposed interior side walls being non-reflective of said light;

said second set of opposed interior side walls each having a surface that is reflective of said light, and said second set of opposed interior walls curving towards each other at one end to further narrow said opening at the top of said housing;

a cylindrical body positioned between said first set of opposed interior side walls so as to partially obstruct said narrow opening at the top of said housing thereby limiting said device to a narrow field-of-view with respect to said light source and to also limit the electrical output from said photoelectric cell to a pulse of electricity as said device rotates.

2. The device of claim 1 wherein the distance between said first set of opposed interior side walls is 0.010 inches.

3. The device of claim 1 wherein the field of view of said device is ±20 degrees.

4. The device of claim 1 wherein said first set of opposed interior side walls comprises each said wall having a series of parallel ridges thereon.

* * * * *